July 1, 1941.                D. F. WARNER                2,247,825
                            VALVE ARRANGEMENT
                            Filed April 8, 1938

Inventor:
Donald F. Warner,
by Harry E. Dunham
His Attorney.

Patented July 1, 1941

2,247,825

UNITED STATES PATENT OFFICE 2,247,825

VALVE ARRANGEMENT

Donald F. Warner, Swampscott, Mass., assignor to General Electric Company, a corporation of New York Application April 8, 1938, Serial No. 200,939

7 Claims. (Cl. 308—3)

The present invention relates to valve arrangements comprising a casing forming a valve seat in cooperative relation with a movable valve member which may be in the form of a disk secured to a stem. In many arrangements the valve stem is subject to side thrusts causing rapid wear of the stem and guide elements associated therewith. The side thrust on the stem may be caused by fluid flowing through the valve casing or it may be due to bending imposed on the stem in case of an unsymmetrical valve arrangement, as is disclosed, for example, in my copending application, Serial No. 179,169, filed Dec. 10, 1937, and assigned to the same assignee as the present application.

The object of my invention is to provide an improved construction of valve arrangements whereby rapid wear of the stem and guide is considerably reduced. The shortcoming in the usual construction wherein a cylindrical round stem is guided in a cylindrically-bored bushing is that the contact surface between the outer surface of the stem and the inner surface of the bushing approaches a line or even point contact when clearances are enlarged to take care of temperature changes and growth of parts. Small clearances are generally not practicable. The greater the clearance, the greater the unit loading, and as a consequence the wear of the valve stem guide. These drawbacks are overcome in accordance with my invention by the provision of a valve stem which has a portion polygonally-shaped in cross section and a plurality of guide blocks having plane surfaces engaging the plane surfaces of the polygonally-shaped stem portion and cylindrically-shaped surfaces engaging a cylindrical wall of the valve casing.

For a better understanding of what I believe to be novel and my invention, attention is directed to the following description and the claims appended thereto in connection with the accompanying drawing.

Figure 1:
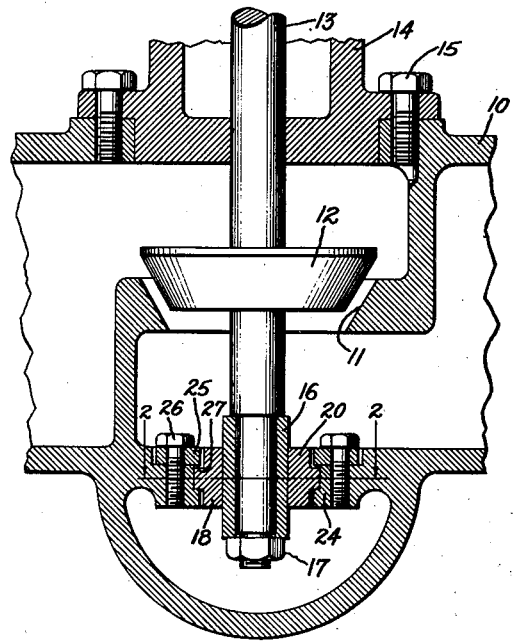
Figure 2:
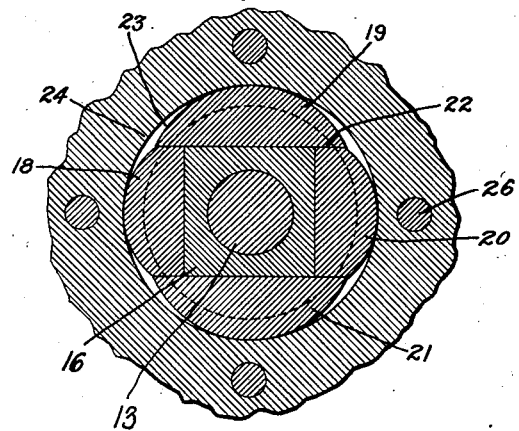

In the drawing, Fig. 1 illustrates a valve arrangement embodying my invention, and Fig. 2 is a sectional view along line 2—2 of Fig. 1.

The arrangement comprises a valve chest or casing 10 which forms a valve seat 11 and a movable valve member, in the present instance a conically-shaped disk 12 in cooperative relation with the seat 11 and secured to a valve stem 13. The upper portion of the stem 13 projects through an opening in a flanged guide 14 secured by a plurality of bolts 15 to the casing 10. The valve disk 12 is secured to an intermediate portion of the stem 13 and the lower portion of the stem is supported by a special guide in accordance with my invention. As shown in the drawing, the stem has a polygonally-shaped member or portion 16 attached to it. This portion is square in cross section in the present instance and is formed by a sleeve secured to a reduced end portion of the stem by means of a nut 17. The width of the nut is smaller than that of the sleeve 16 to facilitate assembly of the structure. The four plane surfaces of the square stem portion 16 are each engaged by guide blocks 18, 19, 20 and 21 respectively. Each of these guide blocks has a plane surface 22 engaging one of the plane surfaces of the square-shaped stem portion and an outer cylindrically-shaped surface 23 bearing against a cylindrical flanged casing portion 24. The four blocks are retained in position by a ring 25 secured to the flanged casing portion 24 by a plurality of bolts 26. The guide blocks 18 to 21, inclusive, are rockingly held on the flanged casing portion 24. Preferably I provide a slight clearance of the order of 5 mils, as indicated at 27. If during operation the valve stem is subject to side thrust or bending forces, such thrust or forces are taken up by the entire area of the plane surfaces of one or two guide blocks engaging these square-shaped stem portions. Thus, if the stem is subject to side thrust acting from the left towards the right in the drawing, such thrust will be taken up by the entire plane surface of the guide block 20, and if the valve stem is subject to side thrust acting at an angle of 45° from the lower left-hand corner in the drawing, the thrust will be taken up by the combined plane surfaces of the guide blocks 19 and 20. To assure that the plane surfaces of the guide blocks completely engage the corresponding surfaces of the valve stem, I provide the aforementioned clearance 27 and in addition I provide the guide blocks with cylindrical surfaces 23 which have diameters smaller than the diameter of the cylindrical surface of the valve portion 24 to permit a slight rocking movement of the guide blocks on their support 24.

Thus, with my arrangement I have eliminated the possibility of excessive loading per unit area of the valve stem and its guide. The forces acting on the guide blocks 18 to 21, inclusive, are transmitted to the flanged casing portion 24. Slight wear of the cylindrically-shaped portions of the guide blocks or segments and the cylindrical wall of the flanged casing portion 24 does not affect proper operation of the valve mechanism.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Valve arrangement comprising a casing, a movable valve stem with a polygonally-shaped portion, and a plurality of blocks rockingly held on the casing and having plane surfaces engaging corresponding surfaces of said portion.

2. Valve arrangement comprising a casing, a movable valve stem with a polygonally-shaped portion, and means for guiding the portion comprising a plurality of blocks each having a plane surface engaging a corresponding surface of the portion and a cylindrically-shaped surface rockingly engaging the casing.

3. Valve arrangement comprising a casing having a cylindrically-shaped flange, a movable valve stem with a portion square in cross section, four guide blocks each having a plane surface engaging a surface of the square-shaped portion and a cylindrically-shaped surface rockingly held on the casing flange.

4. Valve arrangement comprising a casing forming a seat and a cylindrically-shaped flanged support, a valve stem having upper and lower portions, and means for guiding said portions comprising a polygonally-shaped sleeve secured to one portion and a plurality of guide blocks each having a plane surface engaging one of the plane surfaces of the sleeves and a cylindrical surface rockingly engaging and supported on the cylindrically-shaped flanged support.

5. Valve arrangement comprising a casing forming a cylindrically-shaped flange support, a movable valve stem with a polygonally-shaped portion, and means for guiding the portion comprising a plurality of guide blocks each having a plane surface engaging a corresponding surface of the polygonally-shaped portion and a cylindrically-shaped surface engaging and supported on the cylindrically-shaped flanged support, the radii of the cylindrical surfaces of the guide blocks being smaller than the radius of the cylindrical surface of the support and the blocks being loosely held on the support to permit rocking movement of the blocks and complete contact between said plane surfaces.

6. Guiding arrangement for a valve mechanism with a polygonal reciprocating stem subject to side thrust during operation comprising the combination of a guide support having a cylindrical surface and forming part of a valve casing, and a plurality of blocks each having a plane surface for engaging a corresponding surface of a polygonally-shaped valve stem and a cylindrically-shaped surface rockingly engaging the cylindrical surface of the support.

7. Guiding arrangement for valve mechanisms with reciprocating stem comprising the combination of a guide support having a cylindrical surface, and a sleeve for attachment to a valve stem to be guided, said sleeve having a plurality of plane outer surfaces, a plurality of guide blocks having plane surfaces engaging the plane surfaces of the sleeve and cylindrical surfaces engaging the cylindrical surface of the support, the radii of the cylindrical surfaces of the blocks being smaller than the radius of the cylindrical surface of the support.

DONALD F. WARNER.